United States Patent
Widek

(10) Patent No.: US 12,040,694 B2
(45) Date of Patent: Jul. 16, 2024

(54) METHOD, CONTROL UNIT AND VEHICLE FOR HANDLING PHASES IN WHICH MULTIPLE CONVERTERS OPERATE IN AN AT LEAST PARTLY ELECTRICALLY DRIVEN VEHICLE

(71) Applicant: VOLVO TRUCK CORPORATION, Gothenburg (SE)

(72) Inventor: Per Widek, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/061,746

(22) Filed: Dec. 5, 2022

(65) Prior Publication Data

US 2023/0179080 A1  Jun. 8, 2023

(30) Foreign Application Priority Data

Dec. 6, 2021  (EP) .................................. 21212632

(51) Int. Cl.
| | |
|---|---|
| H02M 7/44 | (2006.01) |
| B60L 53/22 | (2019.01) |
| H02J 3/46 | (2006.01) |
| H02M 1/00 | (2006.01) |
| H02M 7/537 | (2006.01) |

(52) U.S. Cl.
CPC .......... *H02M 1/0043* (2021.05); *B60L 53/22* (2019.02); *H02J 3/46* (2013.01); *H02M 7/537* (2013.01)

(58) Field of Classification Search
CPC ........ H02M 1/0043; H02M 7/537; H02J 3/46; B60L 53/22
See application file for complete search history.

(56) References Cited

U.S. PATENT DOCUMENTS

| | | | | |
|---|---|---|---|---|
| 2009/0034308 A1* | 2/2009 | Welchko | ................ | B60L 58/20 363/133 |
| 2010/0019702 A1* | 1/2010 | Jang | ................... | G01R 19/0092 323/282 |
| 2013/0264872 A1 | 10/2013 | Tago et al. | | |

(Continued)

FOREIGN PATENT DOCUMENTS

DE  102018220809 A1  6/2020

OTHER PUBLICATIONS

Extended European Search Report in corresponding European Application No. 21212632.0 dated May 25, 2022 (11 pages).

(Continued)

*Primary Examiner* — Jared Fureman
*Assistant Examiner* — Esayas G Yeshaw
(74) *Attorney, Agent, or Firm* — Venable LLP; Jeffri A. Kaminski

(57) ABSTRACT

A method performed by a control unit for handling phases in which multiple converters operate in an at least partly electrically driven vehicle. The converters are parallel power electric converters each comprised in a respective EMD. The converters are connected to a power supply via a DC supply link. At least one of the converters is adapted to communicate with at least one of the remaining of the multiple converters via a communication interface. The control unit detects that a first converter operates in a first phase. The control unit initiates at least one of the remaining converters to operate phase shifted compared to the first converter.

11 Claims, 6 Drawing Sheets

(56) References Cited

U.S. PATENT DOCUMENTS

2017/0093284 A1\* 3/2017 Suekawa .............. B60W 20/00
2021/0006178 A1 1/2021 Kumar et al.

OTHER PUBLICATIONS

B. Vinodh Kumar et al; "Automotive in vehicle network protocols"; 2014 International Conference on Computer Communication and Informatics; Date of Conference: Jan. 3-5, 2014; Conference Location: Coimbatore, India; Computer Science; DOI:10.1109/ICCCI. 2014.6921836; 5 pages.

\* cited by examiner

METHOD, CONTROL UNIT AND VEHICLE FOR HANDLING PHASES IN WHICH MULTIPLE CONVERTERS OPERATE IN AN AT LEAST PARTLY ELECTRICALLY DRIVEN VEHICLE

TECHNICAL FIELD

The present disclosure relates generally to a method, a control unit and an at least partly electrically driven vehicle. More particularly, the present disclosure relates to handling phases in which multiple converters operate in an at least partly electrically driven vehicle.

The invention can be applied in at least partly electrical heavy-duty vehicles, such as trucks, buses, and construction equipment etc. Although the invention will be described with respect to a fully electrified truck, the invention is not restricted to this particular vehicle, but may also be used in other vehicles such as buses, trailers, wheel loaders, articulated haulers, excavators, backhoe loaders, passenger cars, marine vessels etc. It may also be applied in electrical systems of e.g. electrically operated vessels and in various industrial construction machines or working machines. It is applicable in fully electrically operated vehicles as well as in hybrid vehicles, comprising also a combustion engine. The term vehicle will be used herein when referring to any of the vehicle examples above.

BACKGROUND

With the increase of at least partly electrical driven vehicles, the use of electronic circuits in vehicles is consequently also increasing. Along with this, Electromagnetic Interference (EMI) disturbances becomes a problematic area in vehicles. EMI in relation to road vehicles is defined by International Organization for Standardization (ISO) 7637-1:2015 as "degradation of the performance of equipment, transmission channel or system caused by an electromagnetic disturbance". EMI disturbances are unwanted and often cause of problem and appears or getting know too late in the design where no changes can be done. EMI disturbances may also be referred to as EMI noise.

EMI disturbances may be Common Mode (CM) disturbances or Differential Mode (DM) disturbances. CM disturbances may be described as a current that leaks into the ground plane via parasitic capacitances. This means that the current at the positive conductor and the negative conductor may be of the same size and have the same direction. A reason for this is that the sum is not zero if the feedback conductor is the ground plane or a screen connected to ground. DM disturbances may be described as a current that travels in the opposite direction on the positive and negative pole, respectively. It is the same amount of current at the positive pole as in return to the negative pole, or the other way around. This is regardless if it is a pure DC current or a ripple current.

CM and DM disturbances are unwanted for many reasons. CM disturbances may lead to that the vehicle stops. DM disturbances may generate heat, which may have the consequence of that components break or that their lifetime is reduced.

Today, EMI disturbances in the shape of DM disturbances are reduced by using a filter. However, filters are expensive, they add weight and requires space. Furthermore, off the shelf filters may be difficult to use since they are not tailored made to a specific type and size of EMI disturbances.

Therefore, there is a need to at least mitigate or solve this issue.

SUMMARY

An object of the invention is to provide a method for improved handling of converters in an at least partly electrically driven vehicle.

According to a first aspect of the invention, the method is performed by a control unit and is for handling phases in which multiple converters operate in an at least partly electrically driven vehicle. The multiple converters are parallel power electric converters each comprised in a respective Electric Motor Drive (EMD) of the at least partly electrically driven vehicle. The multiple converters are connected to a power supply via a Direct Current (DC) supply link. At least one of the multiple converters is adapted to communicate with at least one of the remaining of the multiple converters via a communication interface. The control unit detects that a first converter of the multiple converters operates in a first phase. The control unit initiates at least one of the remaining of the multiple converters to operate phase shifted compared to the first converter. Each of the multiple converters produces a voltage ripple on the DC supply link which is dependent on the phase shift. By the provision of a method which initiates at least one of the remaining of the multiple converters to operate phase shifted compared to the first converter, the advantage of evening out the DM disturbance in the at least partly electrically driven vehicle is obtained. With the method, the phase shifting of the converters are performed in a controlled and synchronized fashion, which contributes to reducing the DM disturbances.

According to one embodiment, the control unit may initiate the first converter to operate in the first phase. Hereby an improvement in that the control unit may be able to control both the first converter and at least one of the remaining of the multiple converters is provided. With this centralized control performed by the control unit, any necessary changes to the control operation only needs to be performed in one unit, i.e. the control unit.

According to a further embodiment, the initiation of the first converter to operate in the first phase may takes place at a same time as the initiating of at least one of the remaining of the multiple converters to operate phase shifted. When the initiations take place at the same time, there may be no time delay or as little time delay as possible before all converters operate in their respective phases. This provides an advantage of evening out the DM disturbances in the at least partly electrically driven vehicle as soon as possible such that they make as little damage as possible. Another advantage is that it may reduce the effect on the rest of the system, i.e. the power supply and other converters in the system not comprised in the EMD.

According to a further embodiment, the multiple converters may comprise n number of converters, and then the phase shift between each of the multiple converters may be 360/n degrees perceived on the DC supply link. With this, there may be an advantage that the invention may be scalable to any n number of converters, which makes it a flexible solution used in a variety of applications.

According to another embodiment, the control unit may be comprised in the first converter, or the control unit may be comprised in the EMD in which the first converter is comprised, or the control unit may be a standalone control unit adapted to communicate with the multiple converters. An advantage of the first converter being comprised in the converter or in the EMD may be that it provides a compact design. An advantage of the first control unit being a standalone control unit may be that it may be easy to replace and repair if necessary.

According to another embodiment, the control may be comprised in the first converter, and the first converter may be a master converter and the remaining of the multiple converters may be slave converters in terms of handling the phase shift. Hereby an advantage may be provided in that it may only be necessary to perform changes to the first converter. The remaining of the multiple converters does not necessarily need to be changed.

According to a further embodiment, the multiple converters may be co-located in a same converter unit, or each of the converters in the multiple converters may be separate and standalone converters. An advantage of co-locating the multiple converters in the same converter may be that it provides a compact solution. An advantage of separate and standalone converters may be that it easy to perform maintenance of only one of the converters, to detect malfunctions and to replace a converter if necessary.

According to another embodiment, the method may be performed when the at least partly electrically driven vehicle is in operation and when electric machines connected to the multiple converters produces torque.

According to a second aspect of the invention, the control unit is for handling phases in which multiple converters operate in an at least partly electrically driven vehicle. The control unit is adapted to perform a method according to the first aspect. The control unit may be an electronic control unit comprising processing circuitry for performing the method according to the first aspect. The control unit may be a computer. The control unit may comprise hardware or hardware and software. Advantages and effects of the second aspect of the invention are similar to the advantages and effects with respect to the first aspect of the invention. It shall also be noted that all embodiments of the first aspect of the invention are applicable to and combinable with all embodiments of the second aspect of the invention and vice versa.

According to a third aspect of the invention, the at least partly electrically driven vehicle comprises a control unit according to the second aspect. Advantages and effects of the third aspect of the invention are similar to the advantages and effects with respect to the other aspects of the invention. It shall also be noted that all embodiments of the other aspects of the invention are applicable to and combinable with all embodiments of the third aspect of the invention and vice versa.

According to a fourth aspect of the invention, the program code means are for performing the steps of the first aspect when said program is run on a computer According to a fifth aspect of the invention, computer readable medium carries a computer program comprising program code means for performing the steps of the first aspect when the computer program is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings are not necessarily to scale, and the dimensions of certain features may have been exaggerated for the sake of clarity. Emphasis is instead placed upon illustrating the principle.

DETAILED DESCRIPTION OF EXAMPLE EMBODIMENTS OF THE INVENTION

Figure 1:
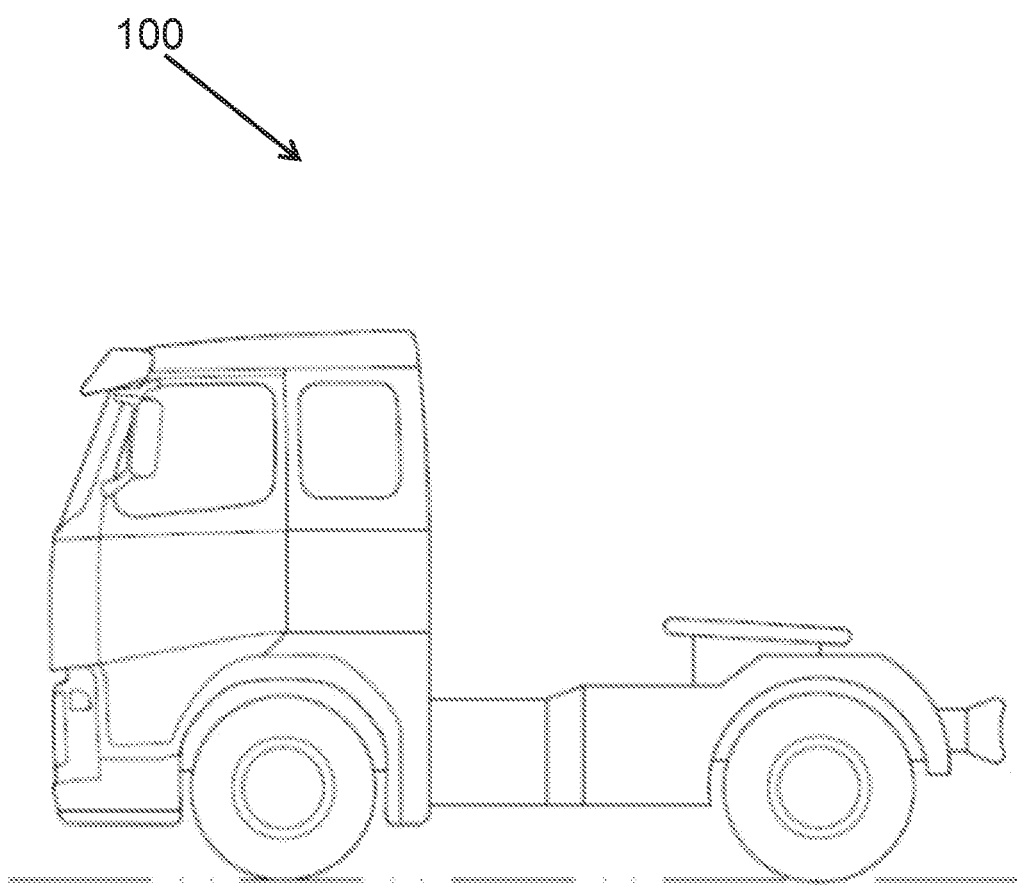
FIG. 1 is a schematic drawing illustrating an at least partly electrically driven vehicle.

FIG. 1 illustrates an at least partly electrically driven vehicle 100. The term vehicle together with the reference number 100 may be used herein for the sake of simplicity when referring to the least partly electrically driven vehicle 100. The at least partly electrically driven vehicle 100 may be fully electrical driven or it may be partly electrical driven. When it is partly electrical driven, also referred to as a hybrid electric vehicle, two types of power are used for driving the vehicle 100 such as an electric machine and a combustion engine.

The vehicle 100 may be a heavy-duty vehicle, such as a truck, bus, construction equipment, trailer, wheel loader, excavator, passenger car, a marine vessel, an electrically operated vessel, a working machine, stationary backup power solution etc., or any other type of vehicle mentioned herein.

Figure 2A:
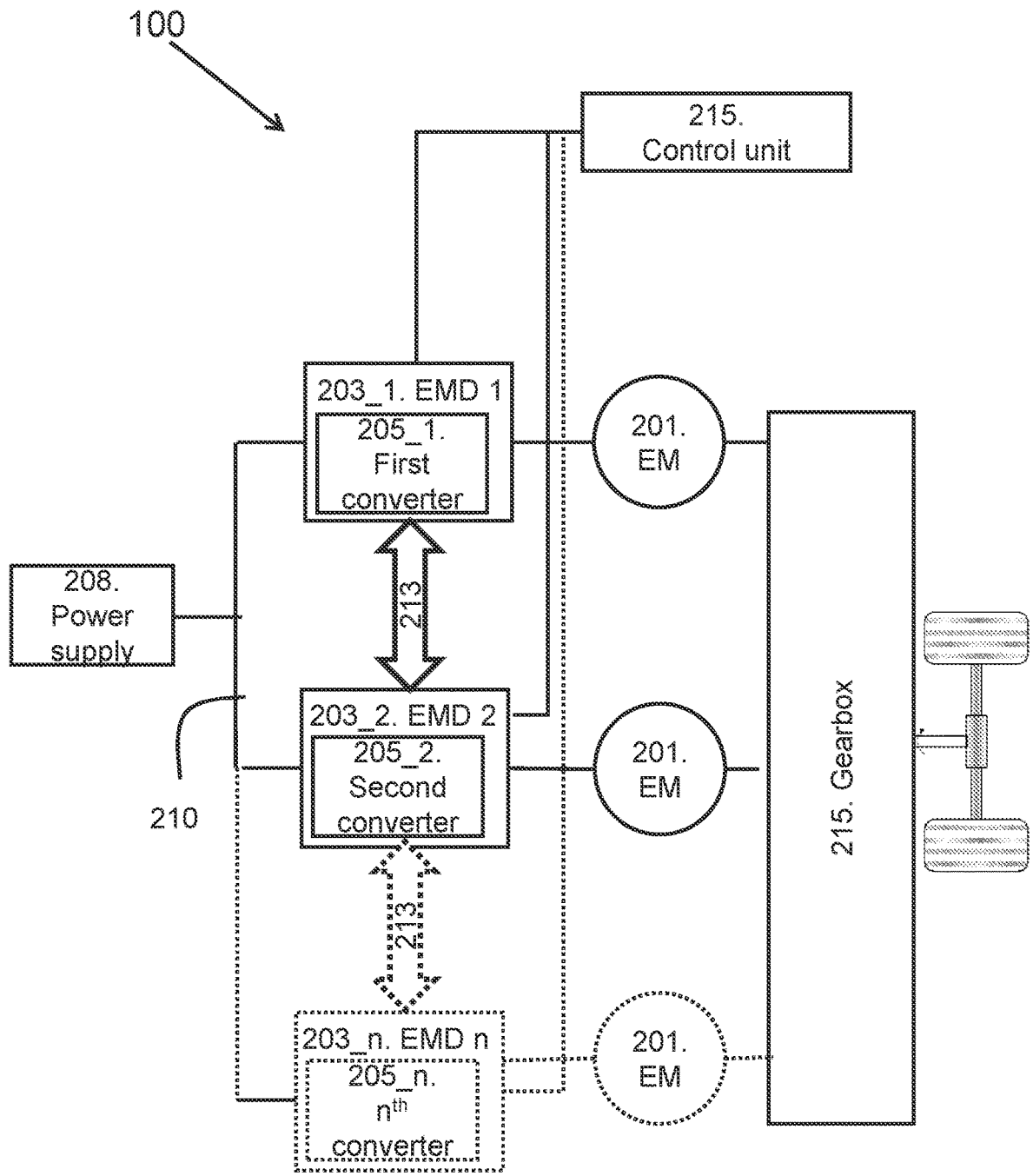
FIG. 2a is a schematic drawing illustrating a part of an the least partly electrically driven vehicle.

FIG. 2a is a schematic drawing illustrating a part of the at least partly electrically driven vehicle 100. In other words, FIG. 2a illustrates some of the components or systems comprised in the vehicle 100. Note that the vehicle 100 may comprise additional components, in addition to the ones illustrated in FIG. 2a, but they are not illustrated herein for the sake of simplicity.

The vehicle 100 comprises multiple electric drive units. Each electric drive unit is adapted to drive a vehicle axle or a wheel on the vehicle axle. Each electric drive unit comprises one or more electric motors (EM) 201 which are adapted to drive the vehicle axle or the wheel on the vehicle axle. The electric drive unit further comprises one or more Electric Motor Drive (EMD) 203 adapted to control one or more electric motors 201. The EMD 203 comprises power electronics, e.g. one or more converters 205, and the EMD 203 may therefore sometimes be referred to as a converter. Together, the EM 201 and the EMDs 203 comprising the converter 205 form the electric drive unit of the vehicle 100. The electric drive units may be located at any suitable location in the vehicle 100.

FIG. 2a further illustrates a power supply 208. The power supply 208 is adapted to supply power, e.g. electric power, to the EM 201. The power supply 208 may be for example a traction battery, a rectified grid supply etc. The power supply 208 is adapted to provide power to the converters 205, the EMDs 203 and the EM 201. The power supply 208 may be described as a passive component or passive subsystem in the vehicle 100. The power supply 208 may be passive n that it is not switched. The power supply 208 is connected to each EMD 203, and consequently also each converter 205, via a DC supply link 210.

FIG. 2a illustrates that the vehicle 100 comprises multiple converters 205, i.e. a first converter 205_1, a second converter 205_2 and an n$^{th}$ converter 205_n, where n is a positive integer which is 2 or larger. The dotted box around the n$^{th}$ converter 205_n indicates that this may be an optional converter and that there may be any number of converters between the second converter 205_2 and the n$^{th}$ converter 205_n. When the reference number 205 is used alone, without the underscore and the number, it refers to any of the converters. The multiple converters 205_1, 205_2, 205_n may be co-located in a same converter unit, or each of the converters in the multiple converters 205_1, 205_2, 205_n may be separate and standalone converters. The converter 205 may be referred to as power electronic converter and may be seen as an active component or active subsystem in the vehicle 100. The converter 205 may be active in that it is switched, i.e. the converter 205 may be a switched converter. The converter 205 is adapted to control and convert the electric power from the power supply 208 such that it ends up in a form suitable to be used by the EM 201, i.e. the output of the converter 205 is a voltage, current, frequency and phase desired by the EM 201. The multiple converters 205 are connected in parallel to the DC supply link 210. Each converter 205 is adapted to operate in a certain phase. A converter 205 may be referred to as a switching device.

The converters 205 comprised in the vehicle may be of any suitable type. They may be of the same type, or they may be of different types. For example, the converters 205 may be 3 phase converters, 6 phase converters, H bridge type converter, or any other suitable converter type. A requirement for the type of converter 205 is that they can communicate, regardless of if they are of the same or different type.

Each of the converters 205 are comprised in a respective EMD 203. The EMD 203 comprises power electronics, e.g. the converter 205, for controlling the EM 201. The vehicle 100 comprises multiple EMD's 203. The first converter 205_1 is comprised in a first EMD 203_1, the second converter 205_2 is comprised in a second EMD 203_2 and the n$^{th}$ converter 205_n is comprised in a n$^{th}$ EMD 203_n. The dotted box around the n$^{th}$ EMD 203_n indicates that this may be an optional converter and that there may be any number of converters between the second EMD 203_2 and the n$^{th}$ EMD 203_n. When the reference number 203 is used alone, without the underscore and the number, it refers to any of the EMD's. The EMD 203 may comprise other units, in addition to the converter 205, but they will not be described herein for the sake of simplicity.

There is a communication interface 213 between one converter 205 and at least one other converter 205 such that one of the converters 205 is adapted to communicate with the other converters via the communication interface 213. One of the converters 205 are adapted to control the other converters 205 via the communication interface 213 and by means of a clock, a PWM control signal, by direct control of semiconductors in the other converters 205 or by any other suitable means. The communication interface 213 may be between:
  a) The first converter 205_1 and each of the remaining of the multiple converters 205, or
  b) The first converter 205_1 and the second converter 205_2, and between the second converter 205_2 and the n$^{th}$ converter 205_n, i.e. there may be a communication interface 213 between all converters 205.

For a), the first converter 205_1 may be adapted to communicate with each of the remaining of the multiple converters 205_2, 205_2 via the communication interface 213.

For b), the first converter 205_1 may be adapted to communicate with one of the remaining of the multiple converters 205, e.g. the second converter 205_2, and the second converter 205_2 may be adapted to forward the communication and control from the first converter 205_1 to the nth converter 205_n via the communication interface 213 etc. The communication interface 213 may be any suitable communication interface, e.g. a high speed communication interface. The speed may be of a size suitable to handle the phase shift. With the communication interface 213, the converters 205 can easily and quickly communicate with each other, and the information about the phase to operate in may be provided to the converters 205 quickly and without no delay or with as little delay as possible.

FIG. 2a illustrates that the vehicle 100 comprises multiple EMs 201. The EM 201 is connected to and adapted to be controlled by a EMD 203. Each EMD 203 may be connected to one or more EMs 201. For example, one EMD 203 may be connected to and adapted to control one EM 201, or one EMD 203 may be connected to and adapted to control multiple EMs 201. Thus, one EMD 203 may be connected to and adapted to control one or more EMs 201. The number of EMs 201 may be the same as the number of EMDs 203 or it may be different. One EM 201 may be supplied by two EMDs 203 if the EM 201 is of six phase type, i.e. 3+3 phases may be provided from two EMDs 203. The electric motor may also be referred to as an electric machine or traction motor. The EMs 210 are connected to transmission device, possibly via a gearbox 215.

FIG. 2a illustrates that the vehicle 100 comprises a control unit 215. The control unit 215 is adapted to control components, systems and subsystems in the vehicle 100. The control unit 215 is adapted to be connected to each converter 205 and to control each converter 205. Thus, the control unit 215 is common for all multiple converters 205. For example, the control unit 215 may be adapted to control in which phase each of the converters 205 operate in. The control unit 215 may be a standalone unit which is separated from the converters 205 and the EMDs 203, or it may be co-located and comprised in one of the converters 205, e.g. the first converter 205_1 or any of the other converters 205, or in an EMD 203. The control unit 215 may be comprised in the first converter 205_1, or the control unit 215 may be comprised in the EMD 203_1, 203_2, 203_n in which the first converter 205_1 is comprised, or the control unit 215 may be a standalone control unit adapted to communicate with the multiple converters 205_1, 205_2, 205_n. If the control unit 215 is comprised in the first converter 205_1, then the first converter 205_1 may be a master converter and the remaining of the multiple converters 205_2, 205_n may be slave converters in terms of handling the phase shift. The control unit 215 may be an electronic control unit comprising processing circuitry for performing the method described herein. The control unit 215 may be a computer. The control unit 215 may comprise hardware or hardware and software.

All switching devices in the vehicle 100 such as for example the converter 205 emit DM disturbances. The converters 205 may disturb each other. However, the impact from these DM disturbances on the system, i.e. the vehicle 100 except the EMD 203, may be minimized. By synchronized system control of the phases between the currents in FIGS. 4 and 5 (these FIGS. will be described in detail later) that the converters 205 operate in, it is possible to avoid amplified DM disturbances and instead lower the DM disturbances.

Figure 2B:
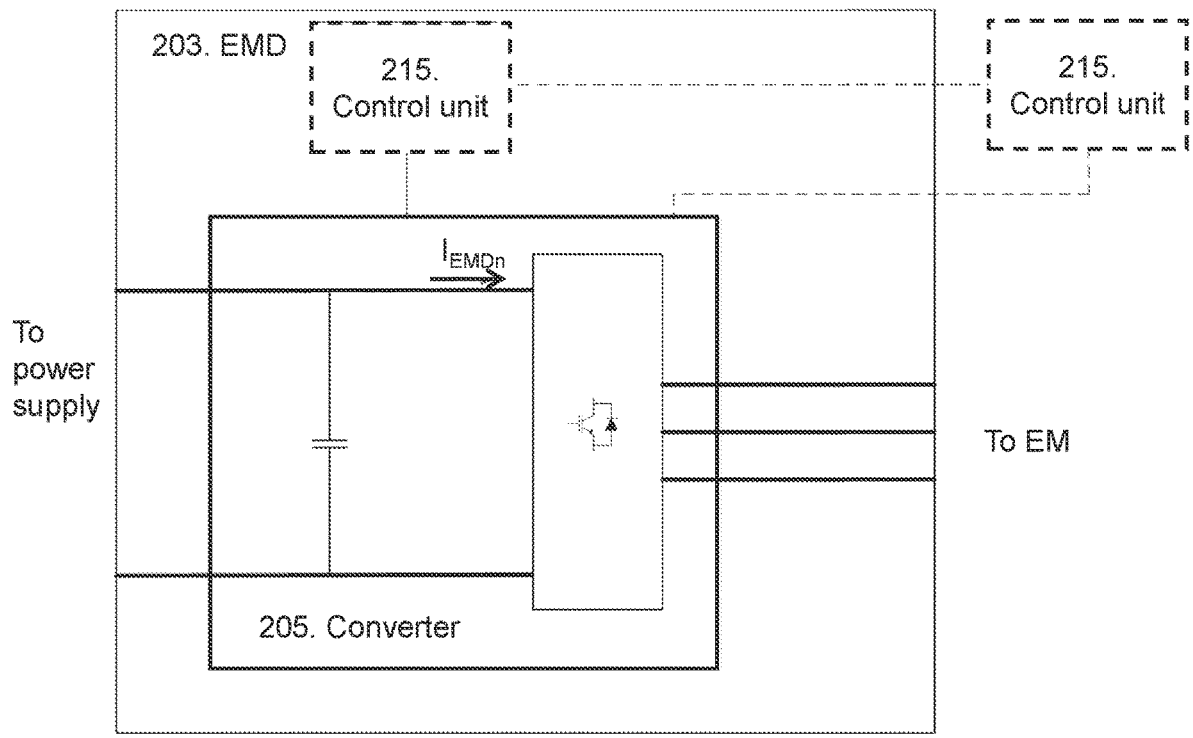
FIG. 2b is a schematic drawing illustrating an EMD.

FIG. 2b is a schematic drawing illustrating an EMD 203. The EMD 203 illustrated in FIG. 2b may be any of the n EMDs 203 in FIG. 2a. As seen in FIG. 2b, the control unit 215 may have two alternative locations, as illustrated with dotted boxes and dotted lines. The control unit 215 may either be comprised in the EMD 203 or it may be a standalone unit located outside the EMD 203 and adapted to be connected to at least one of the EMD 203 and the converter 205. The current $I_{EMD1}$ of the EMD 203 and its direction is illustrated with the arrow in FIG. 2b. The converter 205 exemplified in FIG. 2b is a three-phase converter, as illustrated with the three lines going out to the right from the box representing the converter 205. Note that the converter 205 may not necessarily be a three-phase converter, but it may be any suitable type of converter. The right side of the box representing the EMD 203 is adapted to be connected to an EM 201 and the left side of the box representing the EMD 203 is adapted to be connected to the power supply 208.

Figure 3:
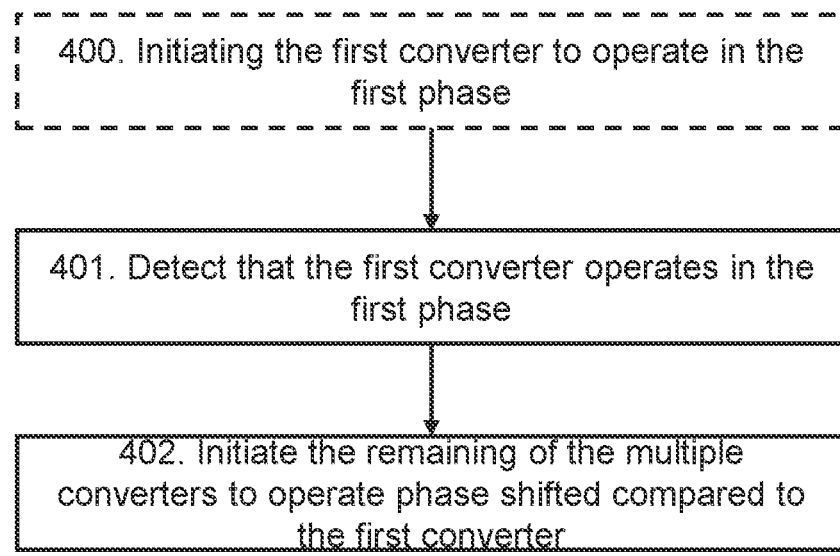
FIG. 3 is a flow chart illustrating a method.

The method performed by the control unit 215 for handling phases in which multiple converters 205_1, 205_2, 205_n operate in an at least partly electrically driven vehicle 100 will now be described with reference to the flowchart depicted in FIG. 3. The multiple converters 205_1, 205_2, 205_n are parallel power electric converters each comprised in a respective EMD 203_1, 203_2, 203_n of the at least partly electrically driven vehicle 100. The multiple converters 205_1, 205_2, 205_n is connected to a power supply 208 via a DC supply link 210. At least one of the multiple converters 205_1, 205_2, 205_n is adapted to communicate with at least one of the remaining of the multiple converters 205_1, 205_2, 205_n via a communication interface 213.

The control unit 215 may be comprised in the first converter 205_1, or the control unit 215 may be comprised in the EMD 203_1, 203_2, 203_n in which the first converter 205_1 is comprised, or the control unit 215 may be a standalone control unit adapted to communicate with the multiple converters 205_1, 205_2, 205_n.

The control unit 215 may be comprised in the first converter 205_1, and then the first converter 205_1 may be a master converter and the remaining of the multiple converters 205_2, 205_n may be slave converters in terms of handling the phase shift.

The multiple converters 205_1, 205_2, 205_n may be co-located in a same converter unit, or each of the converters in the multiple converters 205_1, 205_2, 205_n may be separate and standalone converters.

The method may be performed when the at least partly electrically driven vehicle 100 is in operation and when electric machines 201 connected to the multiple converters 205_1, 205_2, 205_n produces torque.

The method performed by the control unit 215 comprises at least one of the following steps, which steps may as well be carried out in another suitable order than described below.

Step 300

The control unit 215 may initiate the first converter 205_1 to operate in the first phase.

The initiation may be performed by that the control unit 215 sends information to the first converter 205_1 indicating that it should operate in the first phase.

As a result of the initiation, the first converter 205_1 operates in the first phase.

This step may be an optional step. For example, the first converter 205_1 may be already operating in a certain phase when the method starts, and then step 300 does not need to be performed.

Step 301

The control unit 215 detects that a first converter 205_1 of the multiple converters 205_1, 205_2, 205_n operates in a first phase.

The control unit 215 may perform the detection by continuously monitoring the phase of the first converter 205_1, by obtaining information about the phase from some other unit in the vehicle 100 that monitors the phase, by requesting information about the phase from the first converter 205_1 or by any other suitable method.

If the control unit 215 is comprised in the first converter 205_1, then the control unit 215 may always know which phase the first converter 205_1 operates in, since they are co-located and may considered to be the same unit.

Step 302

The control unit 215 initiates at least one of the remaining of the multiple converters 205_2, 205_n to operate phase shifted compared to the first converter 205_1. Each of the multiple converters 205_1, 205_2, 205_n produces a voltage ripple on the DC supply link 210 which is dependent on the phase shift. The voltage ripple is magnified or reduced depending on the phase shift between the first converter 205_1 and the second converter 205_2.

The initiation of the first converter 205_1 to operate in the first phase may take place at a same time, with some tolerance, as the initiating of at least one of the remaining of the multiple converters 205_2, 205_n to operate phase shifted, thus minimizing the voltage ripple. The tolerance for the first converter 205_1 and the at least one of the remaining of the multiple converters 205_2, 205_n to operate phase shifted may be for example maximum 200 ns.

When the multiple converters 205_1, 205_2, 205_n comprises n number of converters, then the phase shift between each of the multiple converters 205_1, 205_2, 205_n is 360/n degrees perceived on the DC supply link 210, where n is a positive integer which is 2 or larger. The n may be described as a control factor and the control factor n is to reduce the DC link ripple current and a control strategy for that. In an example with two converters 205, then the first phase may be +180 degrees and the second phase may be −180 degrees, both seen at the DC supply link 210 or the first phase may be +180 degrees and the second phase may be +180 degrees, both seen at the DC supply link 210. In an example with three converters 205, then the distribution of the phases may be 360/3=120 degrees.

The initiation may be performed by that the control unit 215 sends information to at least one of the remaining of the multiple converters 205_2, 205_n indicating that it should operate phase shifted compared to the first converter 205_1. The information may comprise information about the actual phase that the at least one of the remaining of the multiple converters 205_2, 205_n should operate in.

As a result of the initiation, at least one of the remaining of the multiple converters 205_2, 205_n operates phase shifted compared to the first converter 205_1.

As mentioned earlier, one of the converters 205 is adapted to communicate with the other converters 205 via the communication interface 213. Furthermore, the control unit 215 may be comprised in the first converter 205_1, and then the first converter 205_1 may be a master converter and the remaining of the multiple converters 205_2, 205_n may be slave converters in terms of handling the phase shift. When the control unit 215 is comprised in the first converter 205_1, then the communication interface 213 between the first converter 205_1 and at least one of the remaining of the multiple converters 205_2, 205n may be used by the control unit 215 to initiate at least one of the remaining of the multiple converters 205_2, 205_n to operate phase shifted compared to the first converter 205_1. With the use of the communication interface 213, the at least one of the remaining of the multiple converters 205_2, 205_n quickly obtains information about the phase without any delay or with as little delay as possible. Consequently, the phase shifting may be seen as being performed at the same time, or substantially the same time, thereby evening out any DM disturbances as soon as possible.

Figure 4A:
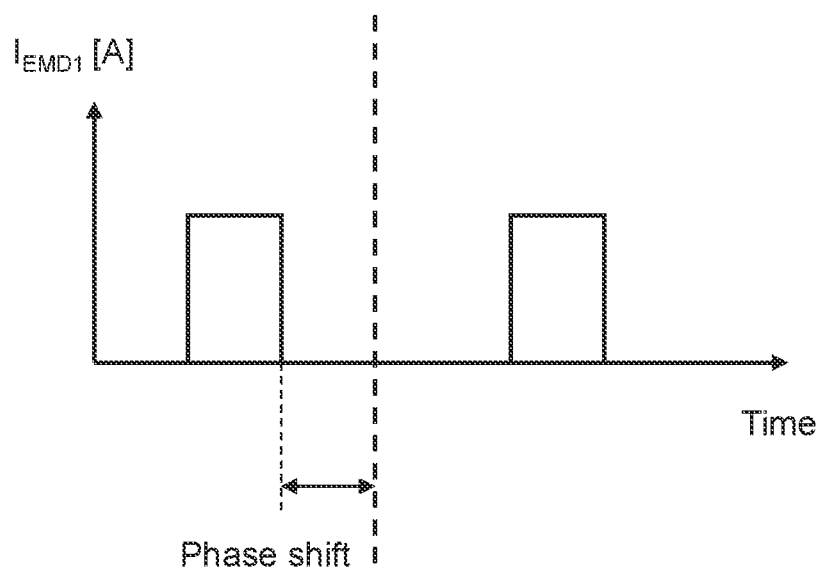
FIGS. 4a and 4b are graphs illustrating current and time.
Figure 4B:
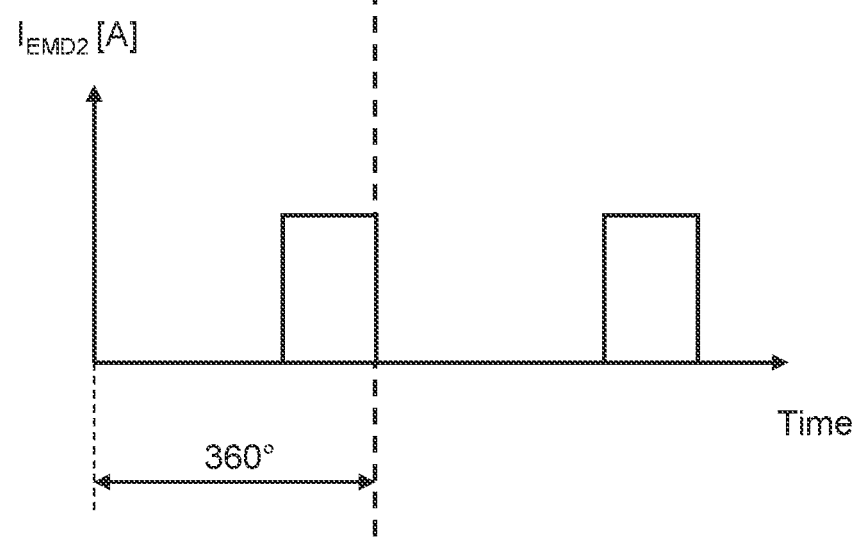

FIGS. 4a and 4b are graphs illustrating the current versus time when the vehicle 100 comprises two converters 205, e.g. a first converter 205_1 comprised in a first EMD 203_1 and a second converter 205_2 comprised in a second EMD 203_2. The x-axis represents time, and the y-axis represents current (I). FIG. 4a shows the current ($I_{EMD1}$) versus time for the first EMD 203_1. FIG. 4b shows the current ($I_{EMD2}$) versus time for the second EMD 203_2. The dotted line illustrates 360 degrees. The current of the second EMD 203_2, and consequently also the second converter 205_2 operates in a phase which is shifted 180 degrees compared to the first phase which the first EMD 203_1, and consequently also the first converter 205_1 operates in.

Figure 5A:
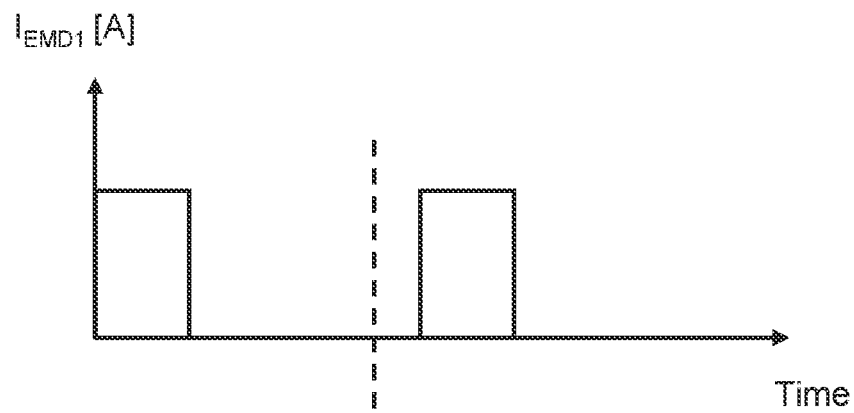
FIGS. 5a, 5b and 5c are graphs illustrating current and time.
Figure 5B:
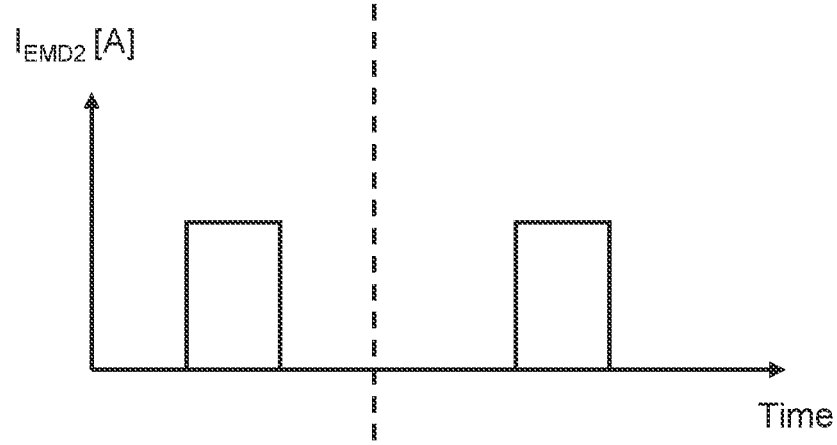
Figure 5C:
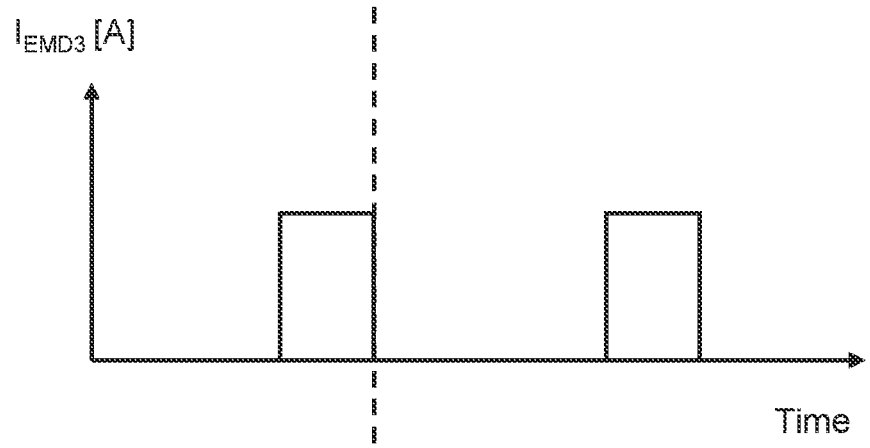

FIGS. 5a. 5b and 5c are graphs illustrating the current versus time when the vehicle 100 comprises three converters 205, e.g. a first converter 205_1 comprised in a first EMD 203_1, a second converter 205_2 comprised in a second EMD 203_2 and a third converter 205_3 comprised in a third EMD 203_3. The x-axis represents time, and the y-axis represents current (I). FIG. 5a shows the current ($I_{EMD1}$) versus time for the first EMD 203_1. FIG. 5b shows the current ($I_{EMD2}$) versus time for the second EMD 203_2. FIG. c shows the current ($I_{EMD3}$) versus time for the third EMD 203_3. The dotted line illustrates 360 degrees. The current of the three EMDs operates in a phase which is 120 degrees phase shifted.

The control unit 215 for handling phases in which multiple converters 205_1, 205_2, 205_n operate in an at least partly electrically driven vehicle 100 is adapted to perform a method as described herein.

The control unit 215 is adapted to, e.g. by means of a processor, detect that a first converter 205_1 of the multiple converters 205_1, 205_2, 205_n operates in a first phase.

The control unit 215 is adapted to, e.g. by means of a e.g. by means of a processor, initiate at least one of the remaining of the multiple converters 205_2, 205_n to operate phase shifted compared to the first converter 205_1. Each of the multiple converters 205_1, 205_2, 205_n produces a voltage ripple on the DC supply link 210 which is dependent on the phase shift.

The control unit 215 may be adapted to, e.g. by means of e.g. by means of a processor, initiate the first converter 205_1 to operate in the first phase.

The control unit 215 may be an electronic control unit comprising processing circuitry for performing the method described herein. The control unit may be a computer. The control unit may comprise hardware or hardware and software.

A computer program may comprise program code means for performing the method described herein when said program is run on a computer. The method may instead be hardware controlled without a computer.

A computer readable medium may carry a computer program comprising program code means for performing the method described herein when said computer program is run on a computer.

An at least partly electrically driven vehicle 100 comprises the control unit 215 described herein.

Summarized, EMI disturbances are a known problematic area and causes a problem in at least partly electrically driven vehicles 100. EMI disturbances appear or getting known too late in the vehicle design where no changes can be done. The EMI can be controlled by hardware design but also with proper control of the converters 205. The present invention enables two or more parallel converters 205 to operate phase shifted. This will cause the DM disturbances to even out for the rest of the system. The disturbances stay between the EMDs 203.

The present invention aims at reducing or removing to DM disturbances in electrified vehicles 100, e.g. hybrid, plug-in hybrids and battery electric vehicles. The invention may be applied for any field with multiple converters 205 use in the same DC system. The invention relates to the control of switching to avoid amplified DM disturbances and instead lower the disturbances by synchronized system control of the converters 205.

An additional communication interface 213 between converters 205 is needed with high-speed control.

During operation, i.e. not zero voltage switching, the master may control the overall switching making sure that the un-symmetries are as small as possible.

It is to be understood that the present invention is not limited to the embodiments described above and illustrated in the drawings; rather, the skilled person will recognize that many changes and modifications may be made within the scope of the appended claims.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

The invention claimed is:

1. A method performed by a control unit for handling phases in which multiple converters operate in an at least partly electrically driven vehicle,
   wherein the multiple converters are parallel power electric converters each comprised in a respective Electric Motor Drive ("EMD") of the at least partly electrically driven vehicle,
   wherein the multiple converters are connected to a power supply via a Direct Current ("DC") supply link, wherein at least one of the multiple converters is adapted to communicate with at least one of the remaining of the multiple converters via a communication interface, the method comprising:
   detecting that a first converter of the multiple converters operates in a first phase; and
   initiating at least one of the remaining of the multiple converters to operate phase shifted compared to the first converter, and wherein each of the multiple converters produces a voltage ripple on the DC supply link which is dependent on the phase shift, wherein the initiating is performed by sending information to at least one of the remaining of the multiple converters indicating that it should operate phase shifted compared to the first converter, wherein each converter comprises a capacitor.

2. The method according to claim 1, further comprising:
initiating the first converter to operate in the first phase, wherein the initiating is performed by sending information to the first converter indicating that it should operate in the first phase.

3. The method according to claim 2, wherein the initiation of the first converter to operate in the first phase takes place at a same time as the initiating at least one of the remaining of the multiple converters to operate phase shifted.

4. The method according to claim 1, when the multiple converters comprises n number of converters, then the phase shift between each of the multiple converters is 360/n degrees perceived on the DC supply link.

5. The method according to claim 1, wherein the control unit is comprised in the first converter, or wherein the control unit is comprised in the EMD in which the first converter is comprised, or wherein the control unit is a standalone control unit adapted to communicate with the multiple converters.

6. The method according to claim 1, wherein the control unit is comprised in the first converter, and wherein the first converter is a master converter and the remaining of the multiple converters are slave converters in terms of handling the phase shift.

7. The method according to claim 1, wherein the multiple converters are co-located in a same converter unit, or wherein each of the converters in the multiple converters are separate and standalone converters.

8. The method according to claim 1, wherein the method is performed when the at least partly electrically driven vehicle is in operation and when electric machines connected to the multiple converters produces torque.

9. A control unit for handling phases in which multiple converters operate in an at least partly electrically driven vehicle,
wherein the multiple converters are parallel power electric converters each comprised in a respective Electric Motor Drive of the at least partly electrically driven vehicle,
wherein the multiple converters are connected to a power supply via a Direct Current supply link,
wherein at least one of the multiple converters is adapted to communicate with at least one of the remaining of the multiple converters via a communication interface,
wherein the control unit is adapted to perform a method according to claim 1, and wherein each converter comprises a capacitor.

10. An at least partly electrically driven vehicle comprising a control unit according to claim 9.

11. A non-transitory computer readable medium carrying a computer program comprising program code for performing the steps of claim 1 when said computer program is run on a computer.

* * * * *